Patented May 18, 1948

2,441,668

UNITED STATES PATENT OFFICE 2,441,668

PROCESS FOR THE PURIFICATION OF MAGNESIUM FLUORIDE FOR USE AS LENS COATING

Frank C. Mathers and Paul S. Visher, Bloomington, Ind.

No Drawing. Application July 26, 1946, Serial No. 686,461

2 Claims. (Cl. 23—88)

This invention relates to the coating of lenses, prisms, windows and the like optical bodies with extremely thin films for the purpose of reducing reflection of light from the surface thereof. More specifically, the invention concerns the application to such bodies of magnesium fluoride films and to the preparation of magnesium fluoride of superior quality for use in coating such optical bodies.

Prior to this invention, magnesium fluoride has been used for coating optical bodies and accordingly that operation is not herein claimed broadly. In coating lenses with magnesium fluoride, the lenses are heated in a very high vacuum in which some magnesium fluoride has been vaporized by a highly heated tungsten wire adjacent to a quantity of magnesium fluoride. In this process, magnesium fluoride has a tendency to outgas and sputter whereby soft and defective films are produced. Various attempts have been made to overcome the difficulties mentioned by utilizing magnesium fluoride of very high purity or from various sources with the idea that freedom from particular injurious impurities would be avoided. Such attempts have proved unsuccessful. Extreme purity has not proved effective to prevent sputtering and outgassing whereas the present invention has enabled successful use of both highly pure and relatively less pure material. This invention consists in the discovery that by melting magnesium fluoride under suitable conditions and holding it at a suitable temperature for a suitable period of time, sputtering and outgassing during application to optical bodies can be prevented.

Sputtering is due to violent, sudden release of gasses or vapors inside of particles of magnesium fluoride—an action similar to the popping of corn. If corn is heated or dried until no water remains, it will not pop! In a similar way, if the magnesium fluoride is heated at a high enough temperature (although at atmospheric pressure) until all outgassing and sputtering have ceased, there can be none of these troubles during the filming.

At the original conception of the invention, it was thought that the heat treatment of the magnesium fluoride was the really important thing and that very high purity of the magnesium fluoride was not necessary. With this idea in mind, an induction furnace was ordered especially for this work. The important advantages of such a furnace are: (1) there is no contamination from combustion gases, (2) the rate of heating is very rapid, and (3) much higher and more easily controlled temperatures are possible than with any other type of furnace.

The research carried out with the induction furnace has proved that complete fusion of the magnesium fluoride would remove all gases and partly remove the more volatile substances, depending upon the temperature and time of heating; therefore material, prepared in this way, should not sputter or outgas when heated in the filming operation.

The problem was solved immediately when the laboratory size induction furnace was used. Magnesium fluoride could be melted in graphite crucibles in 5–8 minutes. Such samples outgassed and sputtered until well melted. There was always a little sputtering during the entire time that the material was kept molten. This was shown quite definitely to be due to the reaction of the magnesium oxide, present in the magnesium fluoride, with the carbon of the graphite crucible, whereby carbon monoxide and metallic magnesium were formed. The white sparks resulted when this metallic magnesium distilled from the hot mass and burned to oxide in the air. This reaction was proved by the fact that the addition of magnesium oxide to the magnesium fluoride greatly increased the formation of these sparks above the molten mass. Final samples of magnesium fluoride, melted as above described, contained about 0.5 per cent of magnesium oxide. Sputtering due to this reaction is impossible in the filming operation because there is no carbon or oxygen present.

There is some crucible difficulty. The graphite, at these high temperatures, oxidizes; therefore the more exposed top part of a crucible burns off and its capacity is gradually reduced. At last, a new crucible must be used. Some protection is possible by covering the graphite crucible with an inverted crucible.

The melting temperature of magnesium fluoride is 1396° C. This is higher than can be reached in any ordinary electrical muffle or gas furnace. Heating at or near the melting point results in elimination of gas and to a greater or less extent other impurities.

Iron, which is a common impurity in these commercial samples of magnesium fluorides, is gradually reduced to metallic iron which collects as pellets in the bottom of the crucible. The longer the mass is kept molten, the more completely is the iron reduced as shown by the fused mass becoming whiter and less yellow in color. If the molten mass is allowed to cool and solidify in the crucible, a considerable portion of these pellets can be mechanically loosened and discarded. If the molten mass is poured from the crucible into a mold, these iron pellets become mixed with the magnesium fluoride and cannot be readily removed. There has been no indication in any of the tests that the iron which is present in the final material makes any trouble. Molten magnesium fluoride contracts when it solidifies; hence the solid magnesium fluoride can be easily removed from a crucible or mold.

Heating at 950° C. or higher but below the melting point for several hours, e. g. 4 to 8 hours, improves the material but it is preferred to actually melt it and hold it in a molten state for from the shortest possible time say a second or two before cooling is allowed to begin up to an hour or longer. It is preferred to hold the material in molten condition for from 5 minutes to half an hour. The heating must be carried out under non-oxidizing conditions or at most weakly oxidizing conditions since otherwise too much magnesium fluoride will be converted to the oxide. It is preferable to have the heating carried out under strongly reducing conditions as for example, in a covered carbon crucible. The crucible may be composed of graphite and when the molten magnesium fluoride has been sufficiently heated it may be allowed to solidify in the crucible in which it is heated or it may be poured into a graphite mold.

Magnesium fluoride of fair purity (88% or better) from various sources, when melted as described above, gave satisfactory results. Various methods of preparing magnesium fluoride were tried and the product from these various methods proved unsatisfactory as produced but proved satisfactory when melted as indicated.

Metallic magnesium could be changed to the fluoride in a mixture of nitric acid and hydrofluoric acid, if the concentration of the hydrofluoric acid was not greater than that of the nitric acid. By adding hydrofluoric acid to the reacting mass at about the rate that magnesium nitrate was formed, it was possible to prepare a large quantity of the fluoride with the use of only a little nitric acid. Each addition of hydrofluoric acid made an equivalent quantity of nitric acid available for reaction. In one experiment 25 gms. of magnesium fluoride were made with the use of only 5 ml. of nitric acid.

Magnesium acetate and magnesium formate were made without any difficulty from metallic magnesium and acetic and formic acids, respectively. These salts were then changed to fluorides by treatment with hydrofluoric acid. Organic acids, if not completely vaporized by the evaporation with hydrofluoric acid, would be burned to oxide, when the final magnesium fluoride was heated. The oxide would not vaporize during filming and should not harm the lenses. The results were no better than with other starting materials.

Pieces of metallic magnesium were burned in air. This gave a mixture of magnesium oxide and magnesium nitride both of which would react with hydrofluoric acid to form a pure magnesium fluoride. This method was abandoned because the burning of the magnesium was too vigorous a reaction for safety. Metallic magnesium, as a starting material, offered the advantage of high purity.

Chemically pure magnesium nitrate was treated with pure hydrofluoric acid. The advantage of a nitrate instead of a chloride is that, on heating the final fluoride, any unchanged nitrate would probably be completely changed into an oxide.

Chemically pure light magnesium oxide and dense magnesium oxide; commercial magnesium oxide from mineral magnesite; seawater oxide both light and dense; and U. S. P., both light and heavy magnesium oxide were changed to fluoride with both technical and chemically pure hydrofluoric acid. Magnesium fluosilicate, available on the market, decomposes into magnesium fluoride when heated. An objection of this material is its high cost and low yield to magnesium fluoride. Some very good preparations were obtained from it.

These various samples gave good results after melting as did the "pure" and "technical" magnesium fluorides available in the market. The commercially available magnesium fluoride is so much more economical that it should be used. It is impossible to make a magnesium fluoride in the laboratory at any cost approaching $17.00 per one hundred pounds for a dry material ready for melting. The analysis of a typical commercial magnesium fluoride suitable for the present process and selling at $17.00 per cwt., was given by the manufacturer as follows:

| | Per cent |
|---|---|
| Loss at 100° C. | 3.2 |
| Loss on ignition | 7.26 |
| Water soluble | 7.49 |
| $SiO_2$ | None |
| Calcium | None |
| Magnesium | 34.40 |
| Magnesium calculated as magnesium fluoride | 88.06 |
| Fluorine | 54.0 |
| Fluorine calculated as magnesium fluoride | 88.55 |

The preferred temperature of heating is from the melting point of magnesium fluoride (1396° C.) to 1475° C. No consistent difference in tests was noted for the same magnesium fluoride poured from the crucibles as soon as melted, or kept molten for 5 minutes, 15 minutes, or for one hour.

The following specific examples from actual practice will serve to illustrate the invention:

*Example I*

Magnesium fluoride was prepared by reacting U. S. P. magnesium oxide with technical aqueous hydrofluoric acid, fifty per cent, in a platinum dish. After evaporating to dryness, the residue was retreated with 50 ml. of water and 20 ml. of hydrofluoric acid and again evaporated to dryness. The final product contained 1.7% of oxide. The product was melted and kept fused for 38 minutes, then allowed to cool in the graphite crucible in which it was melted. This material was applied as a coating on a glass lens by vaporizing it in a vacuum and condensing it on the lens in accordance with usual practice. There was no sputtering or outgassing. The result was considered very satisfactory.

*Example II*

The procedure of Example I was repeated except that the product was kept molten for only 7 minutes. The result was very satisfactory.

*Example III*

The procedure of Example I was repeated except that the product was kept molten for 13 minutes. The result was very satisfactory.

Example IV

Commercial magnesium fluoride obtained from the manufacturer and having the analysis hereinabove set forth was fused in a graphite crucible and kept molten for 15 minutes and then applied as a film on a glass lens in a vacuum in accordance with usual practice. The result was very satisfactory, no sputtering or outgassing. Some samples prepared and used as in this example gave unsatisfactory results however not because of outgassing or sputtering but because the film formed too slowly or was not hard enough.

Having thus described our invention what we claim is:

1. A process for the treatment of magnesium fluoride to render the same suitable as a lens coating material to be vaporized in a vacuum chamber with a lens to be coated which consists essentially in melting a quantity thereof, holding the same molten under reducing conditions for from five minutes to one hour at atmospheric pressure to remove volatile substances and allowing the resulting melt to solidify.

2. A process for the treatment of magnesium fluoride containing at least one reducible iron compound as an impurity to render the same suitable as a lens coating material which consists in melting it in a container under reducing conditions, maintaining it molten and maintaining the reducing conditions from 5 minutes to 60 minutes so as to reduce said iron compound to metallic iron, allowing the melt to cool to a solid condition without removing it from the container and mechanically separating metallic iron therefrom.

FRANK C. MATHERS.
PAUL S. VISHER.

REFERENCES CITED

The following references are of record in the file of this patent:

UNITED STATES PATENTS

| Number | Name | Date |
|---|---|---|
| 2,301,456 | Sabine | Nov. 10, 1942 |